United States Patent
Lam et al.

(10) Patent No.: US 8,917,992 B1
(45) Date of Patent: Dec. 23, 2014

(54) OPTICAL NETWORK REMOTE NODE FOR WDM-PON AND TDM-PON

(71) Applicant: Google Inc., Mountain View, CA (US)

(72) Inventors: Cedric Fung Lam, Belmont, CA (US); Ben Warren Segura, Morgan Hill, CA (US); Ryohei Urata, Sunnyvale, CA (US); Pedram Zare Dashti, Los Gatos, CA (US); Hong Liu, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 151 days.

(21) Appl. No.: 13/732,863

(22) Filed: Jan. 2, 2013

(51) Int. Cl.
*H04J 14/02* (2006.01)

(52) U.S. Cl.
CPC .................. *H04J 14/0223* (2013.01)
USPC .................. 398/68; 398/79; 398/63; 398/72; 370/352; 370/389

(58) Field of Classification Search
CPC ....................................................... H04J 14/02
USPC ............................................... 398/68, 79, 72
See application file for complete search history.

(56) References Cited

U.S. PATENT DOCUMENTS

| | | | |
|---|---|---|---|
| 5,926,298 | A | 7/1999 | Li |
| 7,773,838 | B2 | 8/2010 | Lee et al. |
| 7,860,397 | B2 | 12/2010 | Mori et al. |
| 8,238,750 | B2 | 8/2012 | Rossetti et al. |
| 8,320,760 | B1 | 11/2012 | Lam et al. |
| 2005/0129404 | A1 | 6/2005 | Kim et al. |
| 2008/0138069 | A1* | 6/2008 | Bouda ............................. 398/63 |
| 2009/0297152 | A1* | 12/2009 | Bainbridge et al. ............ 398/79 |
| 2011/0229140 | A1 | 9/2011 | Ohlen et al. |
| 2012/0230693 | A1 | 9/2012 | Zou |
| 2013/0223841 | A1* | 8/2013 | Lee ................................. 398/72 |

FOREIGN PATENT DOCUMENTS

EP 2533448 A2 12/2012

OTHER PUBLICATIONS

"Optical Network Management System, Remote Testing, Network Monitoring, and Service Provisioning Solution for High-Quality Network Performance", Retrieved from the internet: http://www.jdsu.com/ProductLiterature/onms br fop tm ae.pdf>, 2005, 8 pages, JDSU Uniphase Corporation.

NetCracker, "Comprehensive Telecom Operations and Management Solutions, Product Overview", 2010, 2 pages, NetCracker Technology Corp.

(Continued)

*Primary Examiner* — David Payne
*Assistant Examiner* — Omar S Imail
(74) *Attorney, Agent, or Firm* — Honigman Miller Schwartz and Cohn LLP

(57) ABSTRACT

An optical network remote node includes first and second node inputs, each receiving a multiplexed optical signal, and node outputs, each outputting a separate demultiplexed optical signal. The node includes first and second optical power splitters, each having a splitter input connected to one of the node inputs and splitter outputs connected to corresponding node outputs. The node includes an arrayed waveguide grating having first and second grating inputs connected to the first and second node inputs, respectively, and grating outputs connected to the corresponding node outputs. If the received signal at one of the node inputs is time division multiplexed, the corresponding connected optical power splitter broadcasts the received optical signal at the node outputs. If the received signal at one of the node inputs is wavelength division multiplexed, the arrayed waveguide grating demultiplexes the received optical signals in wavelength and outputs the demultiplexed signals at the node outputs.

24 Claims, 10 Drawing Sheets

(56) References Cited

OTHER PUBLICATIONS

ONMS PON Centralized Remote PON Test System, <http://www.jdsu.com/product- <http://www.jdsu.com/product-literature/onmspon br fop trn ae.pdf>, Jun. 2009, 4 pages, JDSU Uniphase Corporation.

"Homodyne detection", From Wikipedia, the free encyclopedia, <http:///en.wikipedia.org/wiki/Homodyne_detection> retrieved from Internet on Jul. 11, 2011, 1 page.

Optical heterodyne detection, From Wikipedia, the free encyclopedia, <http://en.wikipedia.org/wiki/Opticalheterodyne detection> retrieved from Internet on Jul. 11, 2011, 5 pages.

Lam, Cedric F. et al., "Installation of Fiber-To-The-Premise Using Optical Demarcation Devices", U.S. Appl. No. 12/941,766, filed Nov. 8, 2010.

Lam, Cedric F. et al., "Fiber Diagnosis System for Point-To-Point Optical Access Networks", U.S. Appl. No. 12/985,041, filed Jan. 5, 2011.

Lam, Cedric F. et al., "Detection of Fiber Faults in Optical Fiber Networks", U.S. Appl. No. 13/040,983, filed Mar. 4, 2011.

Lam, Cedric F., "Migratable Wavelength Division Multiplexing Passive Optical Network", U.S. Appl. No. 13/205,055, filed Aug. 8, 2011.

Lam, Cedric F. et al., "Passive Optical Network With Asymmetric Modulation Scheme", U.S. Appl. No. 13/288,555, filed Nov. 3, 2011.

Lam, Cedric F. et al., "Fiber Diagnosis System for WDM Optical Access Networks", U.S. Appl. No. 13/355,233, filed Jan. 20, 2012.

\* cited by examiner

US 8,917,992 B1

OPTICAL NETWORK REMOTE NODE FOR WDM-PON AND TDM-PON

TECHNICAL FIELD

This disclosure relates to optical networks and optical network remote nodes for passive optical networks.

BACKGROUND

Fiber-to-the-home (FTTH) is the delivery of a communication signal through optical fiber from a central office (CD) or optical line terminal (OLT) to a home or a business of a user. Referring to FIGS. 1A and 1B, today's FTTH systems are mostly offered through point-to-multi-point time division multiplexed (TDM) passive optical networks 100 (PONs) using a passive optical power splitter 122 at a remote node 120 (RN) in the field to share a common transceiver 30 at the CO 20, or through point-to-point (pt-2-pt) optical Ethernets (not shown), where a home-run fiber extends all the way back to a CO and each one is terminated by a separate transceiver as opposed to the shared transceiver 30 as shown. A PON 100 is a point-to-multipoint network architecture that uses optical power splitters 122 to enable a single optical feed fiber 10 to serve multiple users 150a-150n (e.g. 16-128). PON 100 provides optical signals from a CO 20 and includes an optical transmitter/receiver or transceiver 30 to a number of optical network terminals (ONUs) 150 that each includes a bidirectional optical transceiver.

Referring to FIG. 1B, one feeder fiber 10 is employed from the CO 20 to a remote node 122, where the signal is split and distributed to, for example, 32 optical network units 150aa-150ag. Referring to FIG. 1C, to achieve the same result as the 1:32 power splitter 122a used, in some examples, two 1:16 power splitters 122b are used. However, by substituting the 1:32 splitter 122a with the two 1:16 power splitters 122b, two feeder fibers 10a, 10b are needed instead of the one feeder fiber 10 in the previous examples.

Compared to pt-2-pt home run systems, a TDM-PON provides beneficial savings in the number of feeder fibers 10 (between a remote node 120 and the central office 20, and in the number of optical transceivers 30 at the CO 20 while saving patch panel space to terminate fibers. However, TDM-PON does not scale well with bandwidth growth. The bandwidth per household is often oversubscribed since the bandwidth per optical line terminal transceiver at the central office 20 is shared among all ONUs 150 that are connected to an OLT 30.

Pt-2-pt systems provide the ultimate high bandwidth to end users 152; however, pt-2-pt uses a great number of both trunk fibers 10 and optical transceivers 30. Thus, pt-2pt systems do not scale well with OLT 30 at the central office 20 and the fiber count between CO 20 and the RN 120, resulting in greater space requirements, higher power, and an increased cost.

A properly implemented WDM-PON system provides CO 20 fiber termination consolidation that a TDM-PON system offers, bandwidth scalability similar to pt-2-pt home-run fiber systems and the easy-to-understand end-to-end Ethernet transparency. However, WDM-PON systems are still under development and to satisfy the short-term surge in bandwidth demand, carriers are deploying cost-effective TDM-PON systems which have matured in technology. A non-disruptive migration strategy from TDM-PON to WDM-PON systems is therefore important.

WDM-PON offers every broadband subscriber 152 a separate wavelength. It provides the benefits of both TDM-PON and pt-2-pt architectures. However, traditional WDM-PON systems are incompatible with TDM-PON systems. A WDM-PON network uses a wavelength demultiplexer as opposed to the power splitter used in TDM-PONs in the field to distribute optical signals to end-users.

SUMMARY

One aspect of the disclosure provides an optical network remote node including first and second node inputs, node outputs, first and second optical power splitters, and an arrayed waveguide grating. Each one of first and second node inputs receives a multiplexed optical signal, and each node output outputs a separate replicated or demultiplexed optical signal. Each optical power splitter has a splitter input connected to one of the node inputs and splitter outputs connected to corresponding node outputs. The arrayed waveguide grating has first and second grating inputs connected to the first and second node inputs, respectively, and grating outputs connected to the corresponding node outputs. If the multiplexed optical signal received at one of the node inputs is time division multiplexed, the corresponding connected optical power splitter replicates the received optical signal by broadcasting the received signals at the node outputs. Additionally, if the optical signal received at one of the node inputs is wavelength division multiplexed, the arrayed waveguide grating demultiplexes the received optical signals (wavelengths) and outputs the demultiplexed signals (wavelengths) at the node outputs. The time division multiplexed and wavelength division multiplexed optical signals occupy different segments of the optical spectrum.

Implementations of the disclosure may include one or more of the following features. In some implementations, the arrayed waveguide grating receives a first multiplexed optical signal from the first node input at its first grating input and a second multiplexed optical signal from the second node input at its second grating input. The arrayed waveguide demultiplexes the multiplexed optical signals, and outputs demultiplexed optical signals corresponding to the first multiplexed optical signal at a first set of node outputs. Furthermore, the arrayed waveguide grating outputs demultiplexed optical signals corresponding to the second multiplexed optical signal at a second set of node outputs. In some examples, the arrayed waveguide grating has a multiplexing/demultiplexing ratio of 2:M (e.g., 2:32). Additionally, the arrayed waveguide grating may output demultiplexed optical signals corresponding to the first multiplexed optical signal at a first set of M/2 (e.g., 16) node outputs, and may output demultiplexed optical signals corresponding to the second multiplexed optical signal at a second set of M/2 (e.g., 16) node outputs.

In some implementations, the arrayed waveguide grating receives a multiplexed optical signal from only one of the node inputs at only one of the grating inputs. The arrayed waveguide grating may be capable of demultiplexing an optical signal having M (e.g., 32) multiplexed signals.

in some implementations, the first and second optical power splitters have the same splitting ratio. The first and second optical power splitters may have a splitting ratio equal to half of a demultiplexing ratio of the arrayed waveguide grating. In some examples, the first and second optical power splitters each have a splitting ratio of 1:M/2 (e.g., 1:16). Additionally or alternatively the arrayed waveguide grating may have a demultiplexing ratio of 1:M or 2×1:(M/2) (e.g., 1:32 or 2×1:16). In some examples, the arrayed waveguide grating has a demultiplexing ratio equal to the sum of the splitting ratios of the first and second optical power splitters.

Another aspect of the disclosure provides a method for accommodating a time division multiplexing optical signal and a wavelength division multiplexing optical signal in a passive optical network. The method includes receiving a multiplexed optical signal in one of first and second node inputs of an optical network remote node. The method also includes demultiplexing the received multiplexed optical signals at the optical network remote node. If the received multiplexed optical signal is time division multiplexed, the method includes optically splitting the received multiplexed optical signal using an optical power splitter. If the received multiplexed optical signal is wavelength division multiplexed, the method includes demultiplexing the received multiplexed optical signals using an arrayed waveguide grating having first and second grating inputs connected to the first and second node inputs, respectively. The time division multiplexed and wavelength division multiplexed optical signals occupy different segments of the optical spectrum. One of the grating inputs receives the multiplexed optical signal. The method also includes outputting the demultiplexed optical signals through node outputs of the optical network remote node. Each node output carries a separate demultiplexed optical signal.

In some implementations, the method further includes receiving first and second multiplexed optical signals in the first and second node inputs, respectively. If one of the received multiplexed optical signals is time division multiplexed, the method includes optically splitting that received multiplexed optical signal using an optical power splitter connected to the corresponding node input. If one of the received multiplexed optical signal is wavelength division multiplexed, the method includes receiving the wavelength division multiplexed optical signal in one of grating inputs. The method may include receiving the first multiplexed optical signal from the first node input at the first grating input and the second multiplexed optical signal from the second node input at the second grating input. If one or both of the multiplexed optical signals are wavelength division multiplexed optical signals then demultiplexing the one or both wavelength division multiplexed optical signals in the arrayed waveguide grating, the method includes outputting demultiplexed optical signals corresponding to the first multiplexed optical signal at a first set of node outputs, and outputting demultiplexed optical signals corresponding to the second multiplexed optical signal at a second set of node outputs.

In some examples, the arrayed waveguide grating has a multiplexing ratio of 2:M (e.g., 2:32), and the method further includes outputting demultiplexed optical signals corresponding to the first multiplexed optical signal at a first set of M/2 node outputs, and outputting demultiplexed optical signals corresponding to the second multiplexed optical signal at a second set of M/2 node outputs. In some examples, the method includes receiving the first multiplexed optical signal from the first node input at a first optical power splitter and the second multiplexed optical signal from the second node input at a second optical power splitter. The first and second optical power splitters may have the same splitting ratio. Additionally, the first and second optical power splitters may have a splitting ratio equal to half of a demultiplexing ratio of the arrayed waveguide grating. Furthermore, the first and second optical power splitters may each have a splitting ratio of 1:16. In some examples, the arrayed waveguide grating has a demultiplexing ratio equal to the sum of the splitting ratios of the first and second optical power splitters. Additionally or alternatively, the method may include receiving a multiplexed optical signal into only one of the node inputs and into only one of the grating inputs.

Another aspect of the disclosure provides a method of upgrading a time division multiplexing passive optical network to a wavelength division multiplexing passive optical network. The method includes connecting an optical combiner to first and second optical fibers. The first and second optical fibers deliver a corresponding multiplexed optical signal to first and second node inputs of an optical network remote node, respectively. The method also includes connecting a wavelength division multiplex passive optical network optical line terminal (OLT), in addition to a time-division passive OLT, to each optical combiner, to allow sending a time division multiplexed optical signal or a wavelength division multiplex optical signal through the each optical fiber. Additionally, the method includes connecting first and second grating inputs of an arrayed waveguide grating to the first and second node inputs of an optical network remote node, respectively, and connecting grating outputs of the arrayed waveguide grating to node outputs of the optical network remote node.

In some implementations, the method further includes connecting a first set of the grating outputs to node outputs shared by a first optical power splitter having a splitter input connected to the first remote node input, and connecting a second set of the grating outputs to node outputs shared by a second optical power splitter having a splitter input connected to the second remote node input. If the multiplexed optical signal received at one of the node inputs is time division multiplexed, the corresponding connected optical power splitter splits the received optical signal and broadcasts the split signals at the remote node outputs. If the optical signal received at one of the node inputs is wavelength division multiplexed, the arrayed waveguide grating demultiplexes the received optical signals and outputs the demultiplexed signals at the remote node outputs.

In some implementations, the first and second optical power splitters have the same splitting ratio. The first and second optical power splitters may have a splitting ratio equal to half of a demultiplexing ratio of the arrayed waveguide grating. The first and second optical power splitters may each have a splitting ratio of 1:16. Additionally or alternatively the arrayed waveguide grating has a demultiplexing ratio of 2:32 (which could be used as a single 1:32 or dual 1:16 demultiplexers).

In some implementations, the arrayed waveguide grating receives a first multiplexed optical signal from the first remote node input at its first grating input and a second multiplexed optical signal from the second remote node input at its second grating input, and demultiplexes the multiplexed optical signals. In addition, the arrayed waveguide grating outputs demultiplexed optical signals corresponding to the first multiplexed optical signal at a first set of remote node outputs, and outputs demultiplexed optical signals corresponding to the second multiplexed optical signal at a second set of remote node outputs. The method may include connecting an arrayed waveguide grating having a multiplex ratio of 2:32. The arrayed waveguide grating outputs demultiplexed optical signals corresponding to the first multiplexed optical signal at a first set of 16 node outputs, and outputs demultiplexed optical signals corresponding to the second multiplexed optical signal at a second set of 16 node outputs.

In some implementations, the method includes disconnecting one of the optical fibers from one of the node inputs. The arrayed waveguide grating then receives a multiplexed optical signal from only one of the node inputs at only one of the grating inputs. The arrayed waveguide grating may be capable of demultiplexing an optical signal having 32 multiplexed signals.

The details of one or more implementations of the disclosure are set forth in the accompanying drawings and the description below. Other aspects, features, and advantages will be apparent from the description and drawings, and from the claims.

DETAILED DESCRIPTION

Fiber to the home (FTTH) is regarded as the end state of broadband access networks as fiber offers virtually unlimited bandwidth. FTTH replaces currently used copper infrastructure (e.g., telephone wires, coaxial cable, etc.). Multiplexing is a method used in optical networks to utilize the large bandwidth of optics to their full benefits. Multiplexing enable several virtual channels to be formed on a single fiber. Therefore, multiplexing several optical signals increases the utility of a network infrastructure. Time division multiplexing (TDM) is a method used to multiplex several signals onto one high-speed digital fiber optic link. TDM multiplexes several signals by establishing different virtual channels using different time slots. Wavelength division multiplexing (WDM) multiplexes the signals by having different virtual channels use different wavelengths.

Figure 1A:
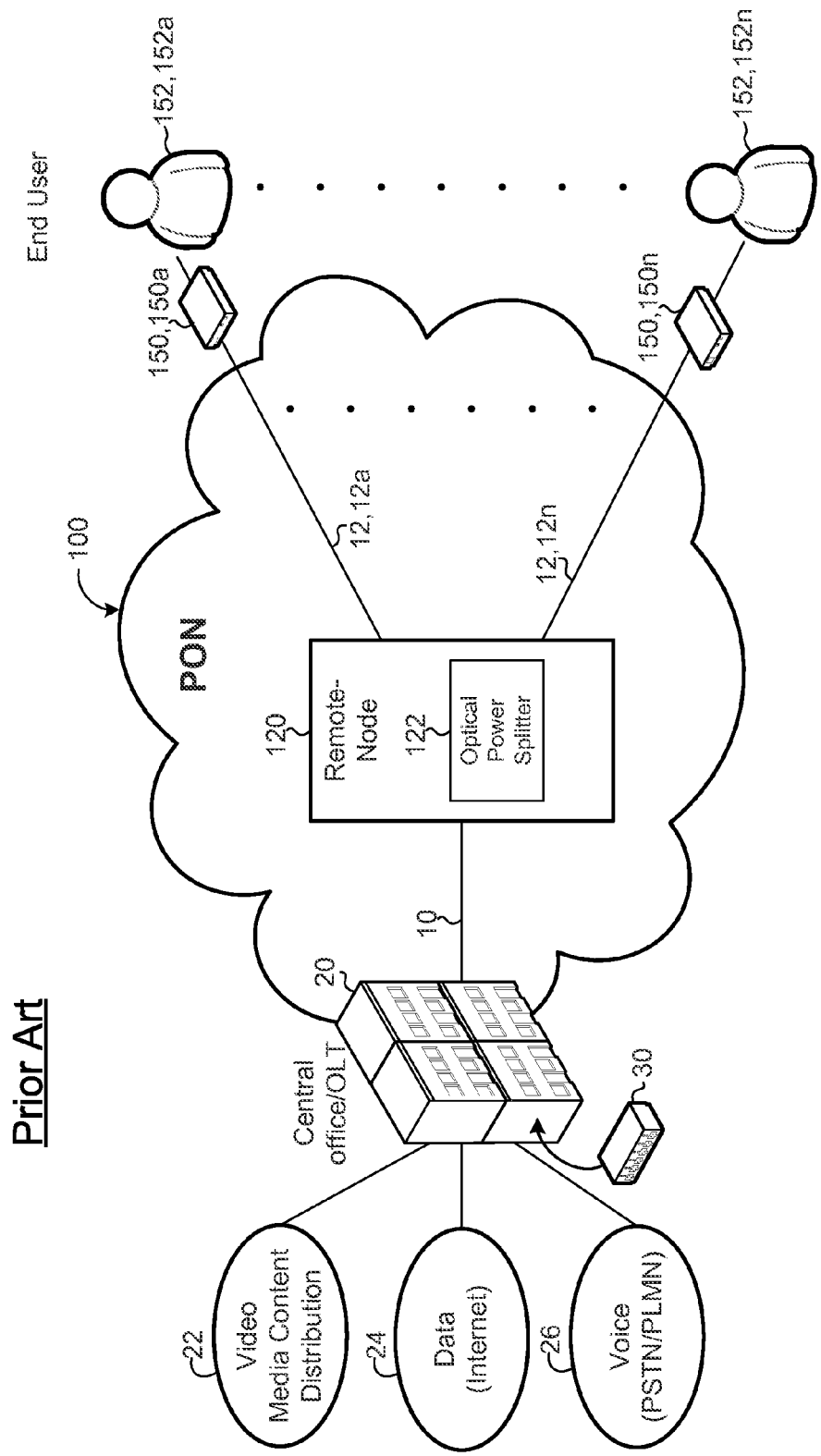
FIG. 1A is a schematic view of a TDM-PON network based on the prior art
Figure 1B:
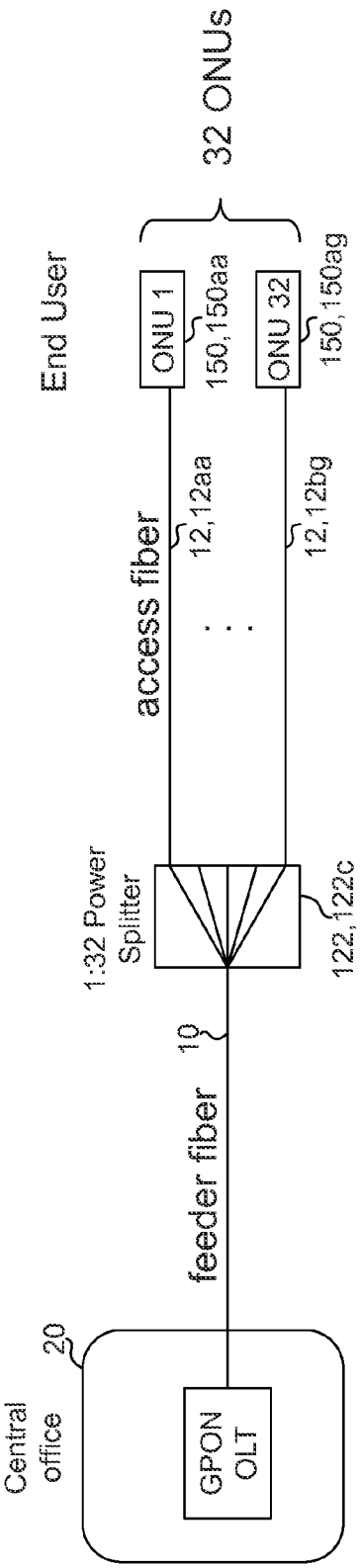
FIG. 1B is a schematic view of a TDM-PON network, using a 1:32 power splitter, based on the prior art.
Figure 1C:
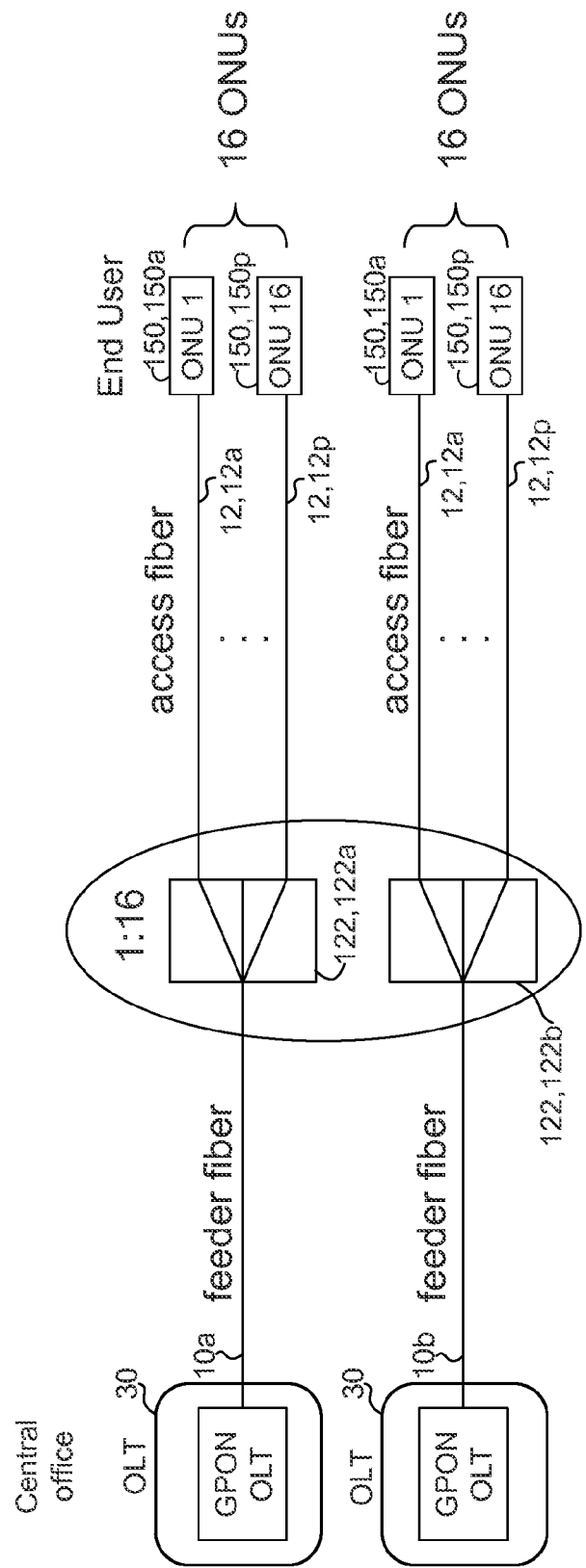
FIG. 1C is a schematic view of TDM-PON network, using two 1:16 power splitter, based on the prior art.
Figure 2A:
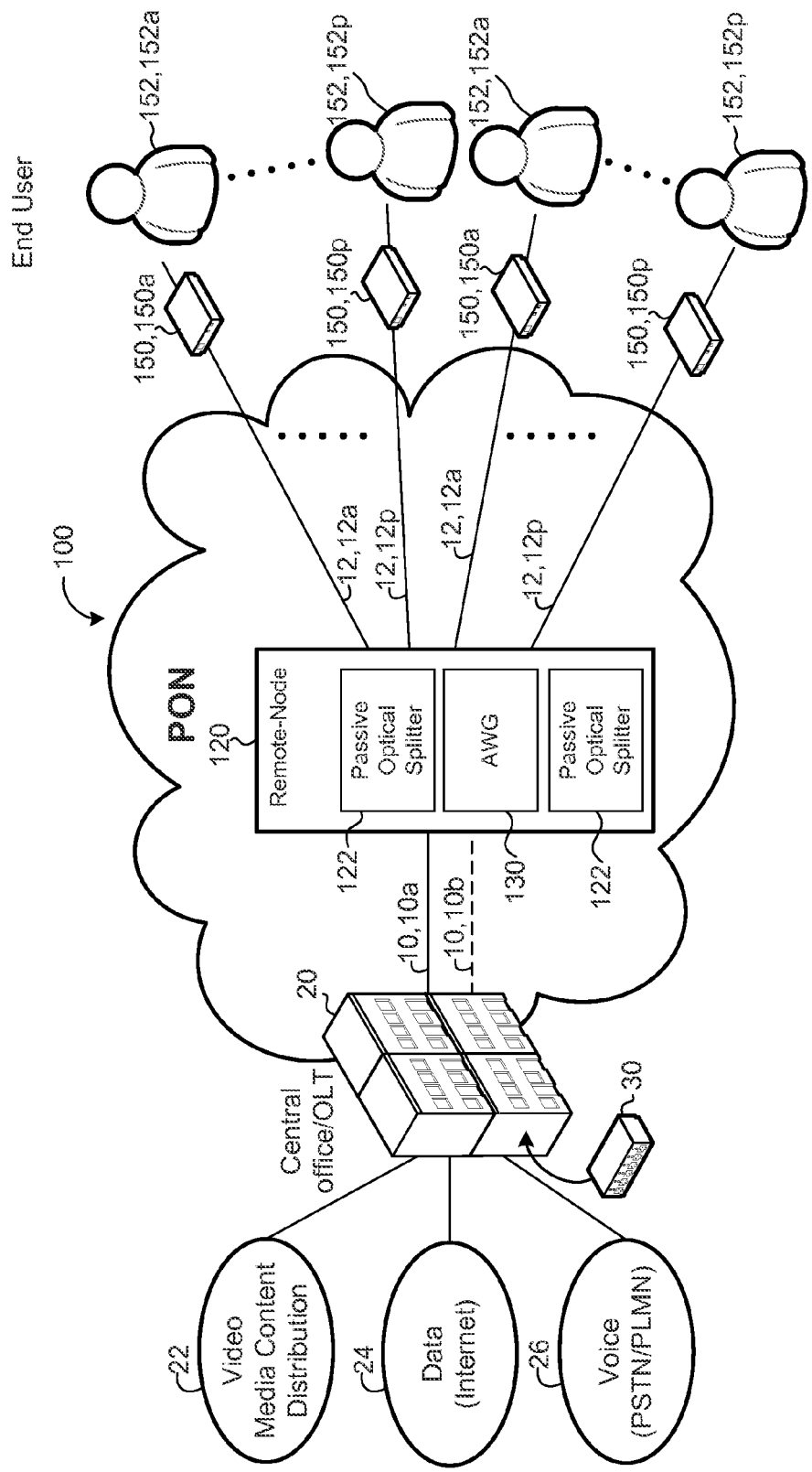
FIG. 2A is a schematic view of an exemplary WDM-TDM-PON network.

Referring to FIG. 2A, commercial FTTH systems are mostly implemented with TDM (time division multiplexed) PON (passive optical network) technologies. A TDM PON shares a single OLT (Optical Line Terminal) transceiver 30 at the CO 20 (Central Office) with multiple end customers 152 using a power splitter 122. The central office 20 receives information such as video media distribution 22, internet data 24, and voice data 26 that may be transferred to the end users 152. The CO 20 includes an optical line terminal 30 (OUT) connecting the optical access network to an IP, ATM, or SONET backbone. Therefore, the OLT 30 device is the endpoint of the PON 100, and converts the electrical signals used by a service provider's equipment and the fiber optic signals used by the PON 100. In addition, GET 30 coordinates multiplexing between the conversion devices at the user end 152. The OLT 30 sends the fiber optic signal through a feeder fiber 10a, and the signal is received by a remote optical distribution node 120 which splits or demultiplexes the optical signal and distributes it to multiple users 152. The remote node 120 includes two passive optical power splitters 122, and an arrayed waveguide 130.

The most commonly deployed TDM PON systems are the GPON system standardized by ITU (International Telecommunication Union) and the EPON system standardized by IEEE (Institute of Electrical and Electronics Engineers). We use GPON to represent TDM-PON system in this description, but EPON systems operate in very similar fashion, especially on the optical layer. A GPON system offers 2.5 Gb/s downstream bandwidth and 1.25 Gb/s upstream bandwidths, shared on the feeder fiber 10 among the users 152, and connected to the same OLT transceiver 30. GPON systems are mature and very cost effective, TDM PON faces difficulty in bandwidth scaling as the optical transceivers 30 at both OLT 20 and ONU 150 ends need to operate at the aggregate bandwidth of all the ONUs sharing the same OLT. Most commercial TDM PONs have been designed with 1:32 power splitting ratio. The bandwidth reach and the per user average bandwidth scales inversely with respect to the splitting ratio.

However, rapidly increasing internet applications are straining the bandwidth available from legacy TDM PON systems. For example, on a fully loaded GPON system with 1:32 splitting ratio, the average downstream bandwidth per user is about 76 Mb/s. One way to increase the average bandwidth per user is to deploy the next generation TDM-PON systems, for example, using NG-PON with 10 Gb/s downstream data-rate. However, these systems are still in development and are very expensive cost-wise. Another way to increase the average bandwidth per user is to reduce the share group size, for example, using 1:16 splitting ratio (as shown in FIG. 2). Compared to 1:32 splitting ratio design, this would double the average bandwidth per user at the cost of doubling the number of feeder fibers 10 and OLT 20 port counts, while keeping the same mature and low-cost legacy GPON equipment. This solution temporarily solves the increase demands for bandwidth. As time goes by, the demands for bandwidth from individual users will keep increasing and the number of users will also increase as take rate increases. To overcome the long term increase in bandwidth demand, a migration to WDM-PON with higher ONU count per feeder fiber 10 is evident to be able to accommodate the increase in bandwidth demand and take rate. Therefore, increasing the splitting ratio using WDM-PON would neither increase the number of feeder fibers required, nor the complexity in the central office 20 terminations.

Referring to FIG. 2A-2D, in some implementations an optical network remote node 120 includes first and second node inputs 126*a*, 126*b*, node outputs 128, 128*a-n* (e.g., outputs 1-32), first and second optical power splitters 122*a*, 122*b*, and an arrayed waveguide grating 200 (AWG, also abbreviated as WGR). The optical power splitters 122 splits TDM-PON signals received from the CO 20, and the AWG 200 demultiplexes WDM-PON signals received from the CO 20 according to wavelengths. The first and second node inputs 126*a*, 126*b* each receives a multiplexed optical signal via an optical fiber 10, and each node output 128, 128*a-n* (e.g., outputs 1-32) outputs a separate demultiplexed optical signal through optical fibers 12 connecting the optical network remote node 120 to the optical network unit 150 (ONU) of an end user 152. Each optical power splitter 122 has a splitter input 123 connected to one of the node inputs 126*a*, 126*b* and splitter outputs 124 connected to corresponding node outputs 128, 128*a-n* (e.g., outputs 1-32). The arrayed waveguide grating 200 has first and second grating inputs 210, 210*a*, 210*q* (e.g., input 1, input 17) connected to the first and second node inputs 126*a*, 126*b*, respectively. In addition, the arrayed waveguide grating 200 has outputs 220, 220*a-n* (e.g., outputs 1-32) connected to the corresponding node outputs 128*a-n* (e.g., outputs 1-32). If the multiplexed optical signal received at one of the node inputs 126*a*, 126*b* is time division multiplexed, the corresponding connected optical power splitter 122a, 122b splits the received optical signal and broadcasts the split signals at the node outputs 128a-n (e.g., outputs 1-32). Additionally, if the optical signal received at one of the node inputs 126a, 126b is wavelength division multiplexed, the arrayed waveguide grating 200 demultiplexes the received optical signals by wavelengths and outputs the demultiplexed signals at the node outputs 128a-n (e.g., outputs 1-32).

The remote node 120 includes an optical power splitter 122b that provides a smaller splitting ratio to be deployed for TDM-PON, e.g. with a 1:16 splitting ratio as opposed to the commonly adopted 1:32, so that more bandwidths are available to end users 152. As bandwidth demand is increasing, users 152 can gradually migrate to 1:16 WDM-PON by introducing WDM-PON OLTs 30b at the CO 20 and WDM-PON capable ONUs 150 at the user 152 side. A higher splitting ratio means that the cost of the OLT 30 is better shared among the ONUs 150, i.e., end users 152. In addition, the splitting ratio affects the system power budget and transmission loss; therefore, the higher the splitting ratio, then higher power transmitters, higher sensitivity receiver, and low-loss optical components are needed. A higher splitting ratio also means that less power remained for transmission fiber loss and smaller margin reserved for other system degradations and variations. Therefore, the use of the higher splitting ratio and the diminishing effects it will create may need consideration. The higher the splitting ratio, the smaller the average effective bandwidth each end user 152 receives. Thus, the remote node 120 allows carriers to deploy TDM PON system with a smaller splitting ratio (1:16), and later seamlessly upgrade to a WDM-PON with twice the splitting ratio (2:32) as demand from single user bandwidth increases and the take rate increases to demand higher-efficiency fiber distribution networks. Since the AWG wavelength splitter 200 does not have the inherent power splitter splitting loss which increases with the splitting ratio, WDM-PON links are also more scalable than links in TDM-PON systems. Additionally, the optical node 120 consolidates the terminal at the CO 20 by sharing a single OLT transceiver 30 with multiple ONUs 150 and therefore minimizing the termination complexity.

Figure 2B:
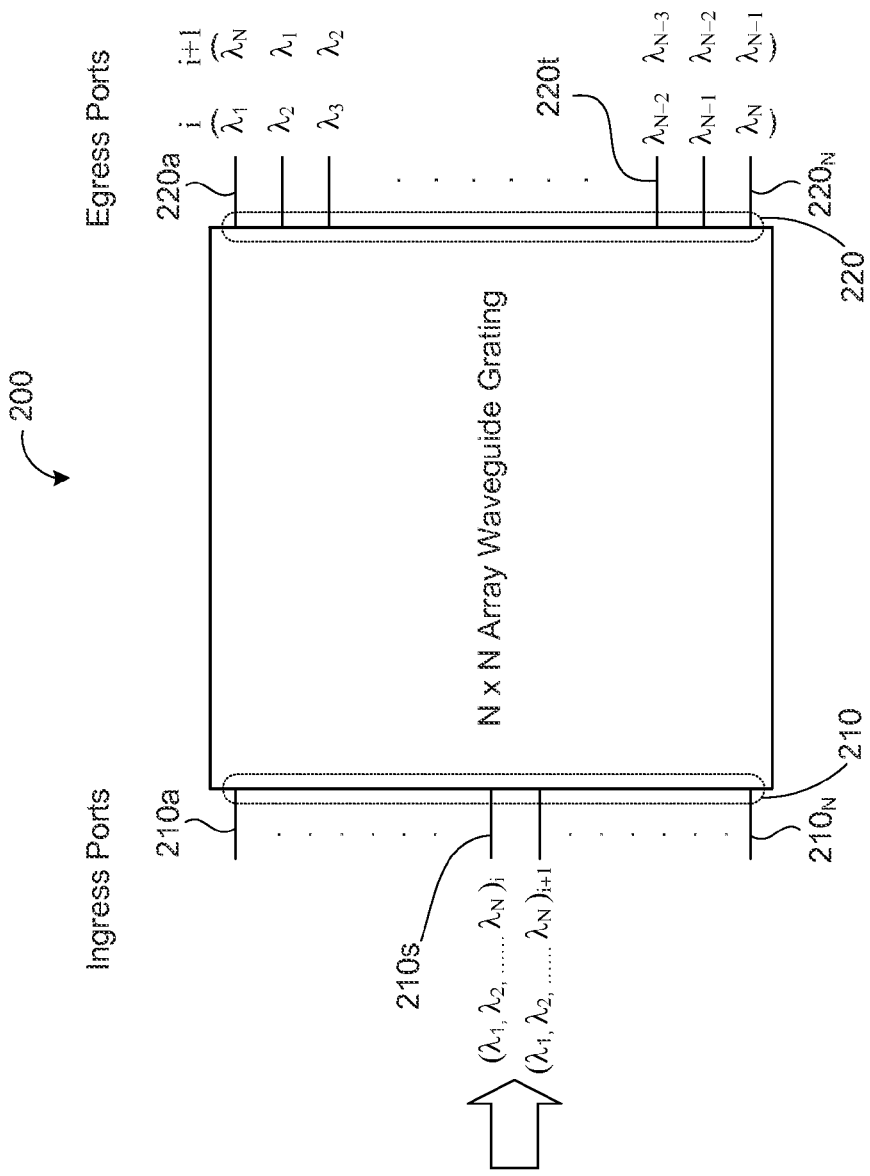
FIG. 2B is a schematic view of an AWG.

FIG. 2B illustrates an exemplary arrayed waveguide grating 200 (AWG). An AWG 200 is commonly used to demultiplex an optical signal in a wavelength division multiplexed system. AWGs 200 can multiplex a large number of wavelengths into one optical fiber, thus increasing the transmission capacity of optical networks. AWGs can therefore multiplex channels of several wavelengths onto a single optical fiber at a transmission end, and reciprocally they can also demultiplex one single channel having different wavelengths at the receiving end of an optical communication network. An AWG 200 is a passive planar light wave circuit device typically used in optical networks as a wavelength multiplexer and/or demultiplexer. N×N AWGs 200 also have wavelength routing capabilities. If a system has N equally-spaced wavelengths $\lambda_N$, an N×N AWG 200 can be designed with an egress port spacing matching the wavelength spacing. The N×N AWG 200 routes differing wavelengths at an ingress port 210 to different egress ports 220 such that all N wavelengths are mapped to all N egress ports $220_N$ sequentially. The routing of the same N wavelengths at two consecutive ingress ports 210 have the wavelength mapping shifted by one egress side, which is noted as cyclic.

In some implementations, the AWG 200 receives a first multiplexed optical signal at a first input 210a (e.g., input 1) via a first optical fiber 10a. The AWG 200 also receives a second multiplexed optical signal at a second input 210g (e.g., input 17) via a second optical fiber 10b. The AWG 200 demultiplexes both receives signals simultaneously and outputs demultiplexed signal through its outputs 220, 220a-n (e.g., outputs 1-32). In some examples, the AWG 200 outputs &multiplexed optical signals corresponding to the first multiplexed optical signal received at the first input 210a (e.g., input 1) at a first set of node outputs 220 (e.g., outputs 1-16). AWG 200 may also output demultiplexed optical signals received from the second input 210q (e.g., input 17) corresponding to the second multiplexed optical signal at a second set of node outputs 220 (e.g., outputs 17-32).

Figure 2C:
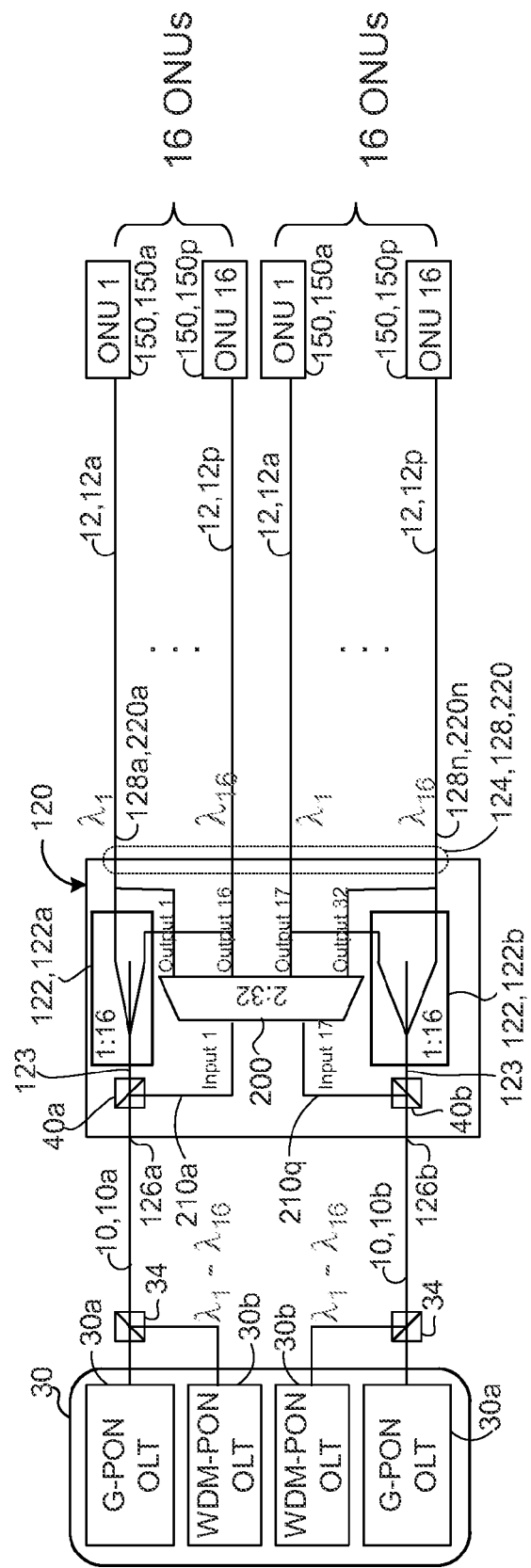
FIGS. 2C and 2D are schematic views of an exemplary WDM-TDM-PON network.

Referring to FIG. 2C, in some implementations, a remote distribution node 120 includes one 2:M (e.g., 2:32) AWG splitter 200 and two 1:(M/2) (e.g., 1:16) power splitters 122b, and acts a hybrid splitter (combining two power splitters 122 and an AWG 200) allowing for smooth upgrade from TDM-PON to WDM-PON. The remote node 120 contains a first 1:M/2 power splitter 122a, a second 1:M/2 power splitter 122b and an AWG 200 splitter, which splits wavelengths as opposed to power. The total number of output ports of the two TDM power splitters and the number of WDM demultiplexed channels are the same (e.g., both equal to 32). The first and second optical power splitters 122a, 122b may have the same splitting ratio. In some examples, the first and second optical power splitters 122a, 122b have a splitting ratio equal to half of a demultiplexing ratio of the AWG 200. Thus, the demultiplexing ratio of the AWG 200 may be equal to the sum of the splitting ratio of the optical power splitters 22a, 122b. In some examples, the AWG 200 receives a multiplexed optical signal from one of its inputs 210 (e.g., input 1, input 17) only. The AWG 200 may demultiplex an optical signal having M multiplexed signals (e.g., 32 multiplexed signals). As an example, if one of the AWG inputs 210 (e.g., input 1) receives a signal having wavelengths $\lambda 1$ through $\lambda 32$, the AWG 200 outputs 32 separate signals at corresponding separate outputs 220 (e.g., output 1 through output 32).

In some implementations, AWG 200 includes two inputs 210a, 210q (input 1 and input 17) receiving signals. Each of the two inputs 210a, 210q is connected to one of the two 1:(M/2) splitters 122b. Therefore, the 2:M AWG splitter 200 is connected to the two 1:(M/2) splitters 122b in a way that the remote node 120 may function as two 1:(M/2) WDM splitters or one 2:M WDM splitter, depending on the type of signal received (a TDM signal, or a WDM signal). In some examples, if the signal received is a TDM signal then remote node 120 performs the function of a dual 1:(M/2) GPON system having two 1:(M/2) power splitters 122b. Therefore, when the bandwidth of each user is being exhausted, two WDM-PON 30b OLTs are added allowing the users 152 to upgrade to WDM PON systems which have better bandwidth scalability. As shown, when the OLT 30 sends a WDM optical signal, the remote node 120 demultiplexes the signal using the AWG 200, and when the OUT sends a TDM signal, the remote node 120 replicates the signal using the power splitter 122b. Therefore, adding the AWG 200 and using two of its inputs 210 to demultiplex a multiplexed optical signal received from the CO 20 allows the users 152 to upgrade from being served by a TDM signal to a WDM and finally migrating the existing systems to 1:32 WDM-PON, freeing up half of the feeder fibers 10 and doubling the total number of users 152 a CO 20 may support.

Following the operating principle of the AWG 200, if the AWG 200 receives a multiplexed signal at a first grating input 210a (e.g., input 1) having wavelengths $\lambda 1$ through $\lambda 16$, the AWG 200 demultiplexes the multiplexed signal and outputs the demultiplexed signals from the grating outputs 220a-p (e.g., output 1-16). If the AWG 200 receives similar multiplexed signal having the same wavelengths $\lambda 1$ through $\lambda 16$ at a second grating input 210q (e.g., input 17), the AWG 200 demultiplexes the multiplexed signal and outputs the demultiplexed signals from the corresponding grating outputs 220q-n (e.g., output 17-32). Thus allowing dual hybrid 1:16 TDM-WDM PONs on a 2:32 hybrid splitter.

WDM systems may use only one of the input ports 210 of an AWG 200. In FIG. 2C, two of the AWG inputs 210a, 210q (input 1 and input 17) are respectively multiplexed to two power splitter inputs 123 through CWDM (Coarse Wavelength Division Multiplexing) filters 40. WDM systems multiplex channels at the transmitter side to combine signals together, and later demultiplex the signals at the receiver end to split the combined signals. In some examples, one device can act as an optical add-drop multiliexer.

Figure 2D:
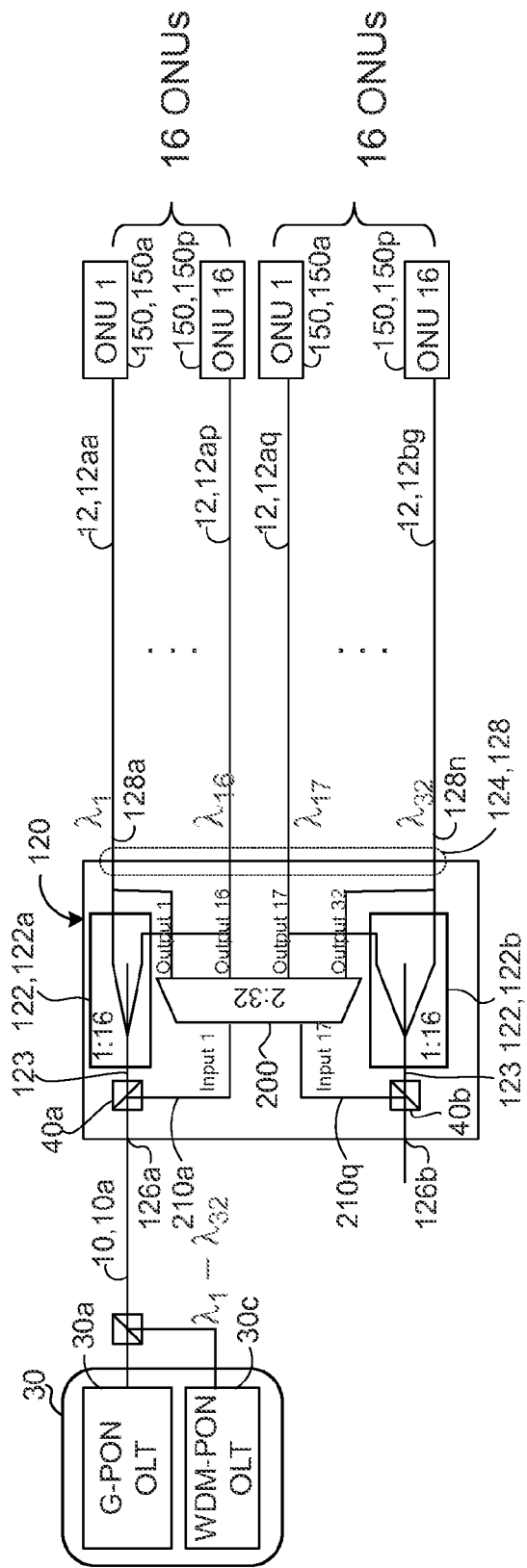

Referring to FIG. 2D, in some implementations, as the users 152 require more bandwidth, a WDM-PON OLT 30c with wavelengths λ1 through λ32 is connected to the first input 126a of the node 120 (we assumes that all new users are WDM-PON users by then), and replaces the WDM-PON OLT 30b having wavelengths λ1 through λ32. By the property of the AWG 200, these 32 different wavelengths λ will exit from the 32 different output ports 128 of the node 120 (which is a hybrid AWG 200) as shown in FIG. 2D. Since no change is required to the remote node 120, a more efficient use of the fiber distribution plant by increasing the number of wavelengths used. This frees up a second feeder fiber 10b, which can be connected to another splitter or node 120 to increase overall end user 152 counts without increasing the number of fibers terminated in the CO 20.

Figure 3:
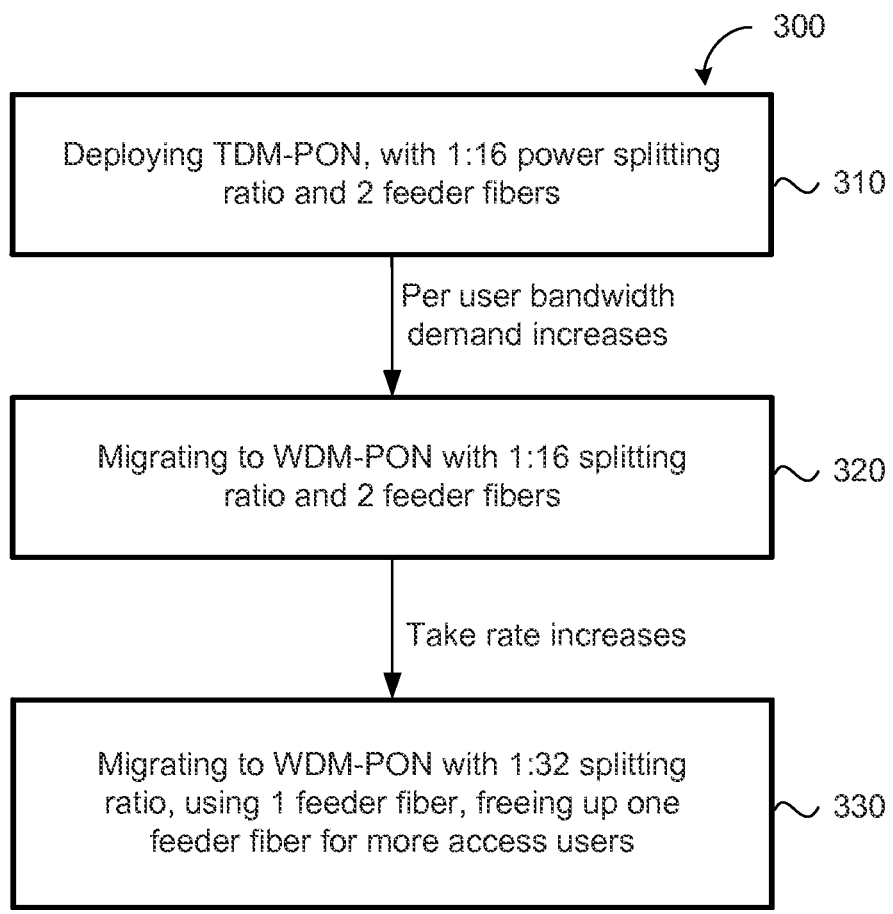
FIG. 3 is a flow chart of the network evolution.

Referring to FIG. 3, the hybrid remote node 120 described above remains constant as fiber optic networks evolve and the demand for more bandwidth is requested per user. The node 120 adapts to the evolution to deployment of TDM-PON, with 1:16 power splitting ratio and two feeder fibers 10a, 10b instead of the prior one feeder fiber 10a. Following, the node 120 also adapts to migration to WDM-PON with 1:16 splitting ratio and a two feeder fiber. Finally, the node 120 adapts to the migration of the WDM-PON with a 1:32 splitting ratio, using one feeder fiber 10a and a 2:32 AWG 200 and freeing up the second feeder 10b for more access users 152. Therefore, the remote node 120 adjusts to the fast increasing demand by the users 152 in bandwidth.

Figure 4:
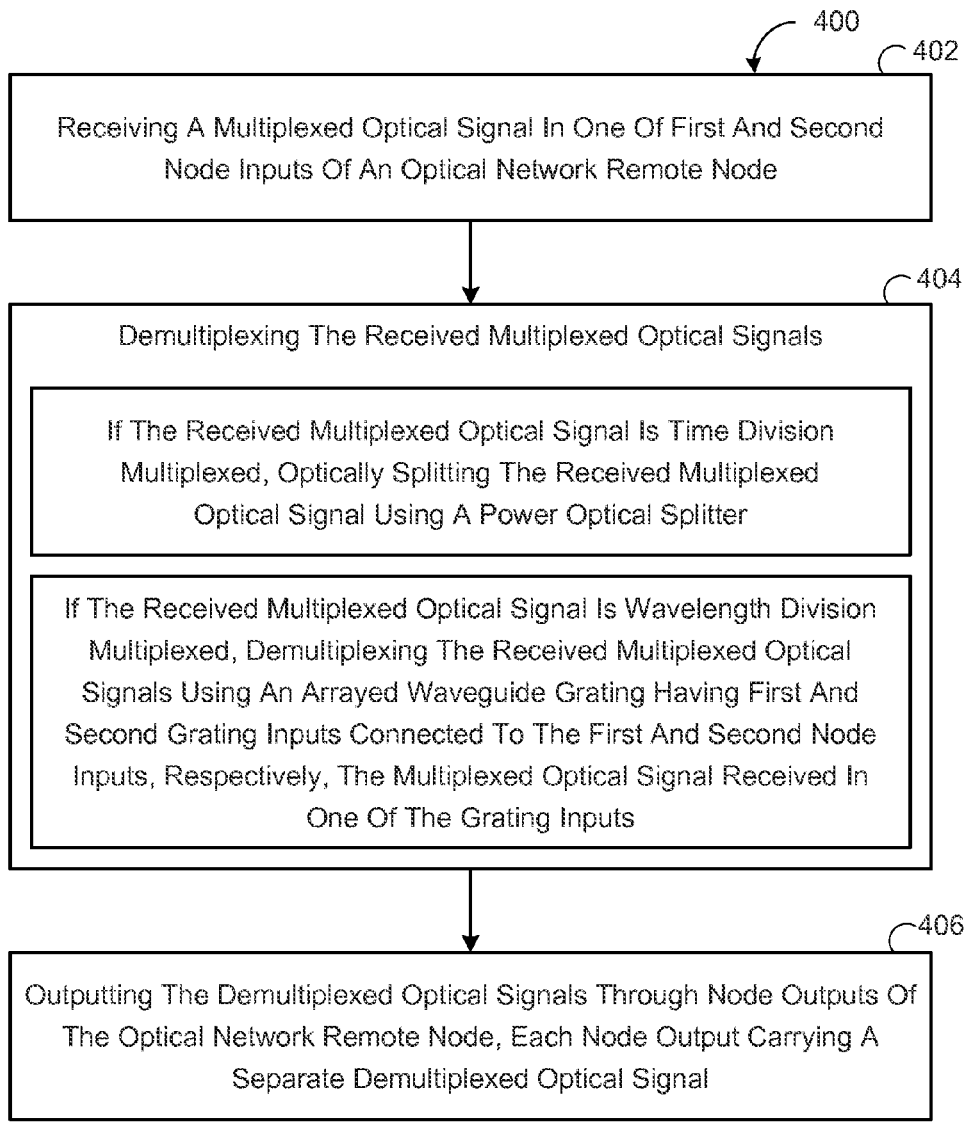
FIG. 4 is a schematic view of an exemplary arrangement of operations for accommodating a TDM and A WDM in a PON.

Referring to FIG. 4, an exemplary method 400 for accommodating a time division multiplexing optical signal and a wavelength division multiplexing optical signal in a passive optical network 100. The method 400 includes receiving 402 a multiplexed optical signal in one of first and second node inputs 126a, 126b of an optical network remote node 120. The method 400 also includes demultiplexing 404 the received multiplexed optical signals at the optical network remote node 120. If the received multiplexed optical signal is time division multiplexed, the method includes optically splitting the received multiplexed optical signal using an optical power splitter 122. If the received multiplexed optical signal is wavelength division multiplexed, the method includes demultiplexing the received multiplexed optical signals using an arrayed waveguide grating 200 having first and second grating inputs 210a, 210q (e.g., input 1 and input 17) connected to the first and second node inputs 126a, 126b, respectively. One of the grating inputs 126a, 126b receives the multiplexed optical signal. The method also includes outputting the demultiplexed optical signals through node outputs 128 (e.g., output 1-output 32) of the optical network remote node 120. Each node output 128 carries a separate demultiplexed optical signal (e.g., λ1 through λ16, or λ1 through λ32).

In some implementations, the method 400 further includes receiving first and second multiplexed optical signals in the first and second node inputs 126a, 126b, respectively. If one of the received multiplexed optical signals is time division multiplexed, the method includes optically splitting that received multiplexed optical signal using an optical power splitter 122a, 122b connected to the corresponding node input 126a, 126b. If one of the received multiplexed optical signals is wavelength division multiplexed, the method includes receiving the wavelength division multiplexed optical signal in one of the grating inputs 210a, 210q (e.g., input 1, input 17). The method 400 may include receiving the first multiplexed optical signal from the first node input 126a at the first grating input 210a (e.g., input 1) and the second multiplexed optical signal from the second node 126b input at the second grating input 210q (e.g., input 17). If one or both of the multiplexed optical signals are wavelength division multiplexed optical signals, the method may include demultiplexing the one or both wavelength division multiplexed optical signals in the arrayed waveguide grating 200, outputting demultiplexed optical signals corresponding to the first multiplexed optical signal at a first set of node outputs 128 (e.g., outputs 1-16), and outputting demultiplexed optical signals corresponding to the second multiplexed optical signal at a second set of node outputs 128 (e.g., outputs 17-32).

In some examples, the arrayed waveguide grating 200 has a multiplex ratio of 2:M, and the method further includes outputting demultiplexed optical signals corresponding to the first multiplexed optical signal at a first set of M/2 node outputs 220 (e.g., outputs 1-16), and outputting demultiplexed optical signals corresponding to the second multiplexed optical signal at a second set of M/2 node outputs 220 (e.g., outputs 17-32). In some examples, the method 400 further includes receiving the first multiplexed optical signal from the first node input 126a at a first optical power splitter 122a and the second multiplexed optical signal from the second node input 126b at a second optical power splitter 122b. The first and second optical power splitters 122a, 122b may have the same splitting ratio, for example, and as shown in FIGS. 2C and 2D, the optical power splitters may both have a ratio of 1:M/2 (e.g., 1:16). Additionally, the first and second optical power splitters 122a, 122b may have a splitting ratio equal to half of a demultiplexing ratio of the arrayed waveguide grating 200 (each optical power splitter 122a, 122b has a ratio of one input that is demultiplexed to result in M/2 outputs, while the arrayed waveguide grating 200 has two times the input as each optical power splitter 122a, 122b and results in double the outputs). Furthermore, the first and second optical power splitters 122a, 122b may each have a demultiplexing ratio of 1:(M/2). In some examples, the arrayed waveguide grating 200 has a demultiplexing ratio equal to the sum of the splitting ratios of the first and second optical power splitters 122a, 122b, as shown the arrayed waveguide grating 200 is 232 which is double the splitting ratio of the optical power splitter being 1:16. Additionally or alternatively, the method 400 may include receiving a multiplexed optical signal into only one of the node inputs 126a, 126b and into only one of the grating inputs 210 (input 1, input 17).

Figure 5:
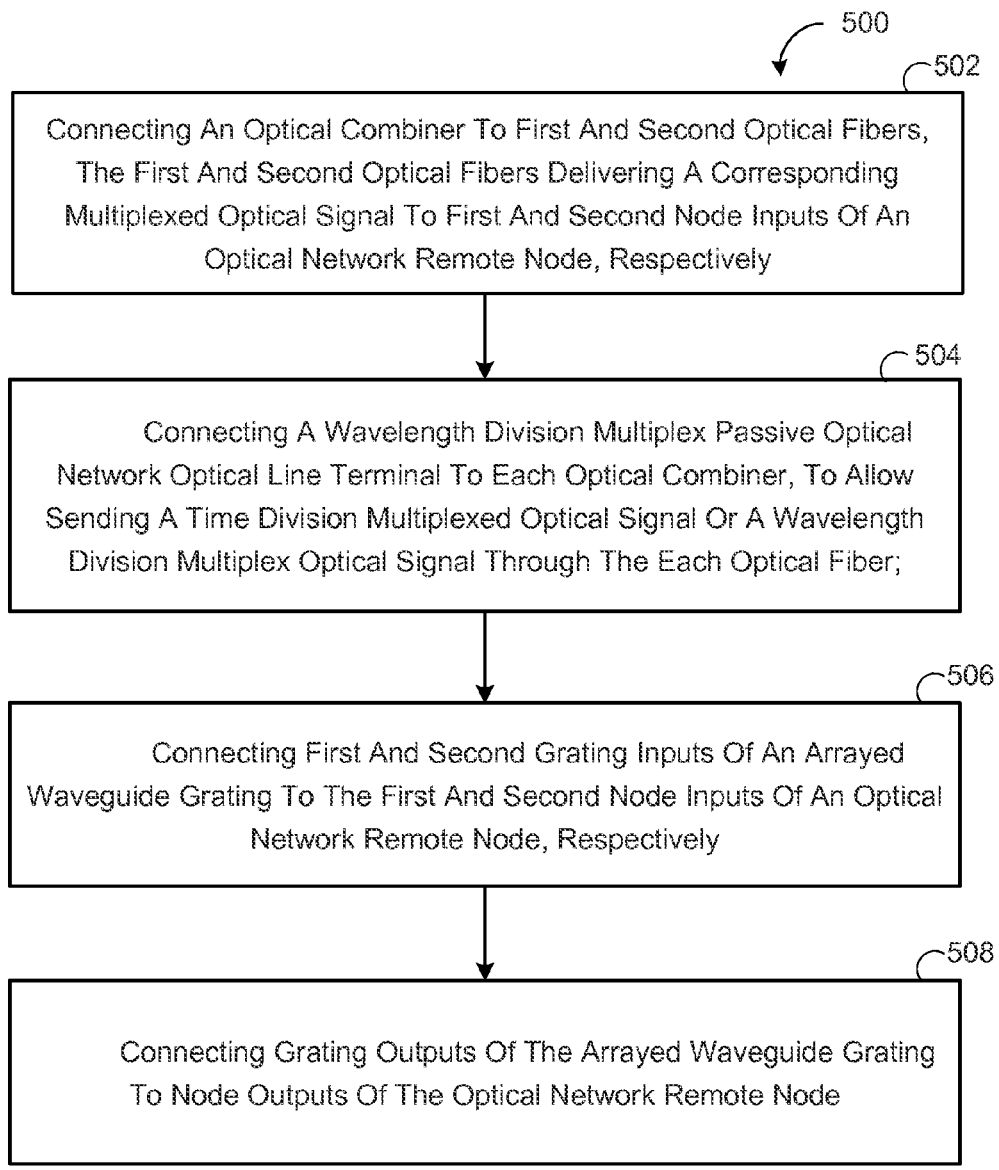
FIG. 5 is a schematic view of an exemplary arrangement of operations for upgrading a time division multiplexing passive optical network to a wavelength division multiplexing passive optical network Like reference symbols in the various drawings indicate like elements.

FIG. 5 provides an exemplary arrangement of operations for method 500 of upgrading a time division multiplexing passive optical network 100 to a wavelength division multiplexing passive optical network 100. The method 500 includes connecting 502 an optical combiner 34 (FIG. 2C) to first and second optical fibers 10a, 10b. The first and second optical fibers 10a, 10b deliver a corresponding multiplexed optical signal to first and second node inputs 126a, 126b of an optical remote node 120, respectively. The method 500 also includes connecting 504 a wavelength division multiplex passive optical network optical line terminal 30b to each optical combiner 34, to allow sending a time division multiplexed optical signal or a wavelength division multiplex optical signal through the each optical fiber 110. Additionally, the method 500 includes connecting 506 first and second grating inputs 210 (e.g., input 1, input 17) of an arrayed waveguide grating 200 to the first and second node inputs 126a, 126b of an optical network remote node 120, respectively, and connecting 508 grating outputs 220 (e.g., outputs 1-32) of the arrayed waveguide grating 200 to node outputs 128 of the optical network remote node 120.

In some implementations, the method 500 further includes connecting a first set of the grating outputs 220 (e.g., outputs 1-16) to node outputs 128 shared by a first optical power splitter 122a having a splitter input 40a connected to the first node input 126a, and connecting a second set of the grating outputs 220 (outputs 17-32) to node outputs 128 shared by a second optical power splitter 122b having a splitter input 40b connected to the second node input 126b. If the multiplexed optical signal received at one of the node inputs 126a, 126b is time division multiplexed, the corresponding connected optical power splitter 122a, 122b demultiplexes the received optical signal and outputs the demultiplexed signals at the node outputs 128 (e.g., outputs 1-32). If the optical signal received at one of the node inputs 126a, 126b is wavelength division multiplexed, the arrayed waveguide grating 200 demultiplexes the received optical signals and outputs the demultiplexed signals at the node outputs 128 (e.g., outputs 1-32).

In some implementations, the first and second optical power splitters 122a, 122b have the same splitting ratio. The first and second optical power splitters 122a, 122b may have a splitting ratio equal to half of a demultiplexing ratio of the arrayed waveguide grating 200. The first and second optical power splitters 122a, 122b may each have a splitting ratio of 1:16. Additionally or alternatively the arrayed waveguide grating has a demultiplexing ratio of 2:32.

In some implementations, the arrayed waveguide grating 200 receives a first multiplexed optical signal from the first node input 126a at a first grating input 210a (e.g., input 1) and a second multiplexed optical signal from the second node input 126b at a second grating input 210q (e.g., input 17), and demultiplexes the multiplexed optical signals. In addition, the arrayed waveguide grating 200 outputs demultiplexed optical signals corresponding to the first multiplexed optical signal at a first set of node outputs 128 (e.g., outputs 1-16), and outputs demultiplexed optical signals corresponding to the second multiplexed optical signal at a second set of node outputs 128 (e.g., outputs 17-32). The method 500 may further include connecting an arrayed waveguide grating 200 having a multiplex ratio of 2:32. The arrayed waveguide grating 200 outputs demultiplexed optical signals corresponding to the first multiplexed optical signal at a first set of 16 node outputs 128 (e.g., outputs 1-16), and outputs demultiplexed optical signals corresponding to the second multiplexed optical signal at a second set of 16 node outputs 128 (e.g., outputs 17-32).

In some implementations, the method 500 further includes disconnecting one of the optical fibers 10a, 10b from one of the node inputs 126a, 126b. The arrayed waveguide grating 200 then receives a multiplexed optical signal from only one of the node inputs 126a, 126b at only one of the grating inputs 210 (e.g., input 1 or input 117). The arrayed waveguide grating 200 may be capable of demultiplexing an optical signal having 32 multiplexed signals. Disconnection one of the fibers 10a, 10b frees up one of the fibers 10a, 10b, which can be connected to another splitter to increase overall end user 152 counts without increasing the number of fibers terminated in the CO 20.

A number of implementations have been described. Nevertheless, it will be understood that various modifications may be made without departing from the spirit and scope of the disclosure. Accordingly, other implementations are within the scope of the following claims.

What is claimed is:

1. An optical network remote node comprising:
   first and second node inputs, each receiving a multiplexed optical signal;
   node outputs, each outputting a separate replicated or demultiplexed optical signal;
   first and second optical power splitters, each having a splitter input connected to one of the node inputs and splitter outputs connected to corresponding node outputs;
   an arrayed waveguide grating having first and second grating inputs connected to the first and second node inputs, respectively, and grating outputs connected to the corresponding node outputs, the arrayed waveguide grating having a demultiplexing ratio equal to the sum of the splitting ratios of the first and second optical power splitters;
   wherein if the multiplexed optical signal received at one of the node inputs is time division multiplexed, the corresponding connected optical power splitter replicates the received optical signal and outputs the replicated signals at the node outputs; and
   wherein if the optical signal received at one of the node inputs is wavelength division multiplexed, the arrayed waveguide grating demultiplexes the received optical signals and outputs the demultiplexed signals at the node outputs.

2. The optical network remote node of claim 1, wherein the arrayed waveguide grating:
   receives a first multiplexed optical signal from the first node input at its first grating input and a second multiplexed optical signal from the second node input at its second grating input;
   demultiplexes the multiplexed optical signals;
   outputs demultiplexed optical signals corresponding to the first multiplexed optical signal at a first set of node outputs; and
   outputs demultiplexed optical signals corresponding to the second multiplexed optical signal at a second set of node outputs.

3. The optical network remote node of claim 2, wherein the arrayed waveguide grating has a multiplex ratio of 2:M the arrayed waveguide grating:
   outputs demultiplexed optical signals corresponding to the first multiplexed optical signal at a first set of M/2 node outputs; and
   outputs demultiplexed optical signals corresponding to the second multiplexed optical signal at a second set of M/2 node outputs.

4. The optical network remote node of claim 1, wherein the arrayed waveguide grating receives a multiplexed optical signal from only one of the node inputs at only one of the grating inputs.

5. The optical network remote node of claim 4, wherein the arrayed waveguide grating is capable of demultiplexing an optical signal having M multiplexed signals.

6. The optical network remote node of claim 5, wherein first and second optical power splitters have the same splitting ratio.

7. The optical network remote node of claim 6, wherein first and second optical power splitters have a splitting ratio equal to half of a demultiplexing ratio of the arrayed waveguide grating.

8. The optical network remote node of claim 7, wherein the first and second optical power splitters each have a splitting ratio of 1:M/2.

9. The optical network remote node of claim 7, wherein the arrayed waveguide grating has a demultiplexing ratio of 2:M.

10. A method for accommodating a time division multiplexing optical signal and a wavelength division multiplexing optical signal in a passive optical network, the method comprising:
receiving a first multiplexed optical signal in a first node input and a second multiplexed optical signal in a second node input of an optical network remote node;
receiving the first multiplexed optical signal from the first node input at a first optical power splitter and the second multiplexed optical signal from the second node input at a second optical power splitter;
demultiplexing the received multiplexed optical signals at the optical network remote node by:
if one of the received multiplexed optical signals is time division multiplexed, optically splitting the received multiplexed optical signal using an optical power splitter connected to the corresponding node input; and
if one of the received multiplexed optical signal is wavelength division multiplexed, demultiplexing the received multiplexed optical signal using an arrayed waveguide grating having first and second grating inputs connected to the first and second node inputs, respectively, the multiplexed optical signal received in one of the grating inputs, the arrayed waveguide grating has a demultiplexing ratio equal to the sum of the splitting ratios of the first and second optical power splitters; and
outputting the demultiplexed optical signals through node outputs of the optical network remote node, each node output carrying a separate demultiplexed optical signal.

11. The method of claim 10, further comprising:
receiving the first multiplexed optical signal from the first node input at the first grating input and the second multiplexed optical signal from the second node input at the second grating input; and
if one or both of the multiplexed optical signals are wavelength division multiplexed optical signals:
demultiplexing the one or both wavelength division multiplexed optical signals in the arrayed waveguide grating;
outputting demultiplexed optical signals corresponding to the first multiplexed optical signal at a first set of node outputs; and
outputting demultiplexed optical signals corresponding to the second multiplexed optical signal at a second set of node outputs.

12. The method of claim 11, wherein the arrayed waveguide grating has a multiplex ratio of 2:M, and further comprising:
outputting demultiplexed optical signals corresponding to the first multiplexed optical signal at a first set of M/2 node outputs; and
outputting demultiplexed optical signals corresponding to the second multiplexed optical signal at a second set of M/2 node outputs.

13. The method of claim 10, wherein the first and second optical power splitters have the same splitting ratio.

14. The method of claim 13, wherein first and second optical power splitters have a splitting ratio equal to half of a demultiplexing ratio of the arrayed waveguide grating.

15. The method of claim 14, wherein the first and second optical power splitters each have a demultiplexing ratio of 1:16.

16. The method of claim 10, further comprising receiving a multiplexed optical signal into only one of the node inputs and into only one of the grating inputs.

17. A method of upgrading a time division multiplexing passive optical network to a wavelength division multiplexing passive optical network, the method comprising:
connecting an optical combiner to first and second optical fibers;
connecting the first and second optical fibers delivering a corresponding multiplexed optical signal to first and second node inputs of an optical network remote node, respectively, the optical network remote node comprising:
node outputs, each outputting a separate replicated or demultiplexed optical signal;
first and second optical power splitters, each having a splitter input connected to one of the node inputs and splitter outputs connected to corresponding node outputs;
an arrayed waveguide grating having first and second grating inputs connected to the first and second node inputs, respectively, and grating outputs connected to the corresponding node outputs, the arrayed waveguide grating having a demultiplexing ratio equal to the sum of the splitting ratios of the first and second optical power splitters;
wherein if the multiplexed optical signal received at one of the node inputs is time division multiplexed, the corresponding connected optical power splitter replicates the received optical signal and outputs the replicated signals at the node outputs; and
wherein if the optical signal received at one of the node inputs is wavelength division multiplexed, the arrayed waveguide grating demultiplexes the received optical signals and outputs the demultiplexed signals at the node outputs; and
connecting the node outputs of the optical network remote node to optical network units.

18. The method of claim 17, wherein first and second optical power splitters have the same splitting ratio.

19. The method of claim 17, wherein the first and second optical power splitters each have a splitting ratio of 1:16.

20. The method of claim 17, wherein the arrayed waveguide grating has a demultiplexing ratio of 2:32.

21. The method of claim 17, wherein the arrayed waveguide grating:
receives a first multiplexed optical signal from the first node input at its first grating input and a second multiplexed optical signal from the second node input at its second grating input;
demultiplexes the multiplexed optical signals;
outputs demultiplexed optical signals corresponding to the first multiplexed optical signal at a first set of node outputs; and
outputs demultiplexed optical signals corresponding to the second multiplexed optical signal at a second set of node outputs.

22. The method of claim 21, wherein the arrayed waveguide grating has a multiplex ratio of 2:M, the arrayed waveguide grating:

outputs demultiplexed optical signals corresponding to the first multiplexed optical signal at a first set of M/2 node outputs; and outputs demultiplexed optical signals corresponding to the second multiplexed optical signal at a second set of M/2 node outputs.

23. The method of claim 17, further comprising disconnecting one of the optical fibers from one of the node inputs, the arrayed waveguide grating receiving a multiplexed optical signal from only one of the node inputs at only one of the grating inputs.

24. The method of claim 23, wherein the arrayed waveguide grating is capable of demultiplexing an optical signal having 32 multiplexed signals.

* * * * *